(12) United States Patent
Kageyama et al.

(10) Patent No.: US 8,439,624 B2
(45) Date of Patent: May 14, 2013

(54) TRANSFER APPARATUS (75) Inventors: Yoshihiro Kageyama, Tochigi (JP); Hiroyuki Nobuta, Tochigi (JP); Yasuhiro Matsui, Tochigi (JP); Tatsuya Sato, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 329 days.

(21) Appl. No.: 12/920,993

(22) PCT Filed: Mar. 2, 2009

(86) PCT No.: PCT/JP2009/053865
§ 371 (c)(1),
(2), (4) Date: Sep. 3, 2010

(87) PCT Pub. No.: WO2009/110427
PCT Pub. Date: Sep. 11, 2009

(65) Prior Publication Data
US 2011/0011703 A1  Jan. 20, 2011

(30) Foreign Application Priority Data
Mar. 5, 2008  (JP) ................................. 2008-055510

(51) Int. Cl.
*B65G 25/02* (2006.01)
*B21D 43/02* (2006.01)

(52) U.S. Cl.
USPC .................... 414/682; 414/733; 198/468.6

(58) Field of Classification Search ............. 198/468.01, 198/468.2, 468.6, 474.1; 414/682, 696, 731, 414/733, 751.1
See application file for complete search history.

(56) References Cited

U.S. PATENT DOCUMENTS

| | | | | |
|---|---|---|---|---|
| 1,766,573 A * | 6/1930 | Westin | ........................... | 414/733 |
| 3,680,881 A | 8/1972 | Douglas | | |
| 3,703,968 A * | 11/1972 | Uhrich et al. | ................. | 414/680 |
| 3,902,606 A * | 9/1975 | Ronbeck | ....................... | 414/733 |
| 4,400,984 A * | 8/1983 | Ronbeck | ......................... | 74/103 |
| 4,589,819 A * | 5/1986 | Shirao | ......................... | 198/468.4 |
| 4,635,493 A * | 1/1987 | Buckley | ....................... | 74/99 R |
| 4,801,235 A * | 1/1989 | Rauschdorf | ............. | 414/225.01 |
| 5,909,997 A * | 6/1999 | Liljengren et al. | ......... | 414/751.1 |
| 6,007,292 A * | 12/1999 | Crandell | .................... | 414/744.6 |
| 6,086,312 A * | 7/2000 | Ziaylek et al. | ............... | 414/462 |
| 6,715,981 B1 * | 4/2004 | Harsch et al. | .............. | 414/752.1 |
| 7,134,541 B2 * | 11/2006 | Matsubara et al. | ...... | 198/468.01 |
| 7,510,070 B2 * | 3/2009 | Rothbauer | .................... | 198/717 |

FOREIGN PATENT DOCUMENTS

| | | |
|---|---|---|
| DE | 3702108 A1 | 8/1988 |
| DE | 10010079 A1 | 9/2000 |

(Continued)

OTHER PUBLICATIONS

Japanese Office Action dated Sep. 4, 2012, 1 page.

*Primary Examiner* — Douglas Hess
(74) *Attorney, Agent, or Firm* — Rankin, Hill & Clark LLP (57) ABSTRACT

A transfer apparatus which performs long-distance transfer at a high speed, while preventing dimensions of the apparatus from increasing. Specifically, a transfer apparatus transfers a work to a pressing machine The transfer apparatus is provided with a base section, a follower arm, which is connected to the base section on the base-section end side such that the follower arm can rotate and vertically slide, and a first driving arm which is rotatably connected to the base section on the base-section end side. The transfer apparatus also includes a driving arm, which is rotatably connected to the first driving arm on the base-section end side and rotatably connected to the follower arm on the leading end side, and a holding apparatus arranged on the leading end side of the follower arm for holding the work.

1 Claim, 6 Drawing Sheets

FOREIGN PATENT DOCUMENTS

| | | |
|---|---|---|
| DE | 10128189 A1 | 12/2002 |
| DE | 102006038505 A1 | 2/2008 |
| EP | 0765828 A1 | 4/1997 |
| EP | 1129800 A2 | 9/2001 |
| JP | S51-71185 U | 6/1976 |
| JP | 1-109326 U | 7/1989 |
| JP | H04-22143 U | 2/1992 |
| JP | 07-187344 | 7/1995 |
| JP | 2732351 | 3/1998 |

\* cited by examiner

TRANSFER DIRECTION

FIG. 8

TRANSFER APPARATUS

TECHNICAL FIELD

The present invention relates to a transfer apparatus. Specifically, it relates to a transfer apparatus that transfers a work to a pressing machine.

BACKGROUND ART

Conventionally, with a press line in which a plurality of pressing machines is aligned, a transfer apparatus that transfers works is provided between pressing machines. This transfer apparatus uses a Scott-Russell mechanism, for example, and includes a holding apparatus that holds a work, a Scott-Russell mechanism that causes this holding apparatus to undergo approximate linear motion, and a hoisting device that causes this Scott-Russell mechanism to ascend and descend (refer to Patent Document 1).

With such a transfer apparatus, when a work is taken from and placed on a pressing machine, the entirety of the Scott-Russell mechanism is made to ascend and descend by the hoisting device.

Patent Document 1: Japanese Patent No. 2732351

DISCLOSURE OF THE INVENTION

Problems to be Solved by the Invention

However, if the transfer distance of the work is long, it is necessary to increase the size of the Scott-Russell mechanism. In this case, it is necessary to also increase the size of the hoisting device that makes the Scott-Russell mechanism ascend and descend, and thus the cost becomes high due to complicating the facility configuration. In addition, even if the Scott-Russell mechanism and hoisting device increase in size, it is difficult to make such a large device to move at high speed, and thus cycle time cannot be reduced, and the productivity of the press line declines.

Therefore, a method of transfer in which a transport means such as a belt conveyor is specially provided in place of the transfer apparatus using the Scott-Russell mechanism, and works are placed on this belt conveyor and transferred has been proposed. According to this method, the transfer distance of the works can be lengthened without increasing the size of the transfer apparatus.

However, the number of times replacing the belt conveyor of the work increases, a loss of time occurs, and thus the work cannot be transferred at high speed.

The present invention has an object of providing a transfer apparatus that can transfer a long distance at high speed while preventing an increasing in size of the apparatus.

Means for Solving the Problems

The transfer apparatus (e.g., the transfer apparatus 20 described later) of the present invention, which transfers a work to a pressing machine, includes: a base section (e.g., the base section 31 described later); a follower arm (e.g., the follower arm 32 described later) that is connected to the base section at a base-section end side to be rotatable and slidable up and down; a first drive arm (e.g., the first drive arm 33 described later) that is rotatably connected to the base section at a base-section end side; a second drive arm (e.g., the second drive arm 35 described later) that is rotatably connected to the first drive arm at a base-section end side, as well as being rotatably connected to the follower arm at a leading end side; and a holding apparatus (e.g., the holding apparatus 21 described later) that is provided to a leading end side of the follower arm and holds the work.

According to this invention, the holding apparatus can move horizontally by regulating the angle formed by the first drive arm and the base section. Furthermore, the holding apparatus can ascend and descend by providing a second drive arm, and regulating the angle formed by this second drive arm and the first drive arm. Therefore, the holding apparatus can be moved to any position, and the degrees of freedom of the transfer path of the work can be improved by regulating the angle formed by the first drive arm and the base section, while regulating the angle formed by the second drive arm and the first drive arm.

In addition, since it is possible for only the holding apparatus to ascend and descend in this way, it is unnecessary to cause the entire apparatus to ascend and descend, and thus the configuration of the transfer apparatus can be simplified.

As a result, a long distance can be transferred at high speed compared to conventionally, by preventing an increase in size of the apparatus.

Effects of the Invention

According to the present invention, the holding apparatus can move horizontally by regulating the angle formed by the first drive arm and the base section. Furthermore, the holding apparatus can ascend and descend by providing a second drive arm, and regulating the angle formed by this second drive arm and the first drive arm. Therefore, the holding apparatus can be moved to any position, and the degrees of freedom of the transfer path of the work can be improved by regulating the angle formed by the first drive arm and the base section, while regulating the angle formed by the second drive arm and the first drive arm.

In addition, since it is possible for only the holding apparatus to ascend and descend in this way, it is unnecessary to cause the entire apparatus to ascend and descend, and thus the configuration of the transfer apparatus can be simplified. As a result, a long distance can be transferred at high speed compared to conventionally, by preventing an increase in size of the apparatus.

EXPLANATION OF REFERENCE NUMERALS 20 transfer apparatus
21 holding apparatus
31 base section
32 follower arm
33 first drive arm
35, 35A second drive arm

PREFERRED MODE FOR CARRYING OUT THE INVENTION

Embodiments of the present invention will be explained hereinafter based on the drawings. It should be noted that, in the explanations of the embodiments hereinafter, the same reference numerals are assigned for the same constituent elements, and explanations thereof are omitted or simplified.

First Embodiment

Figure 1:
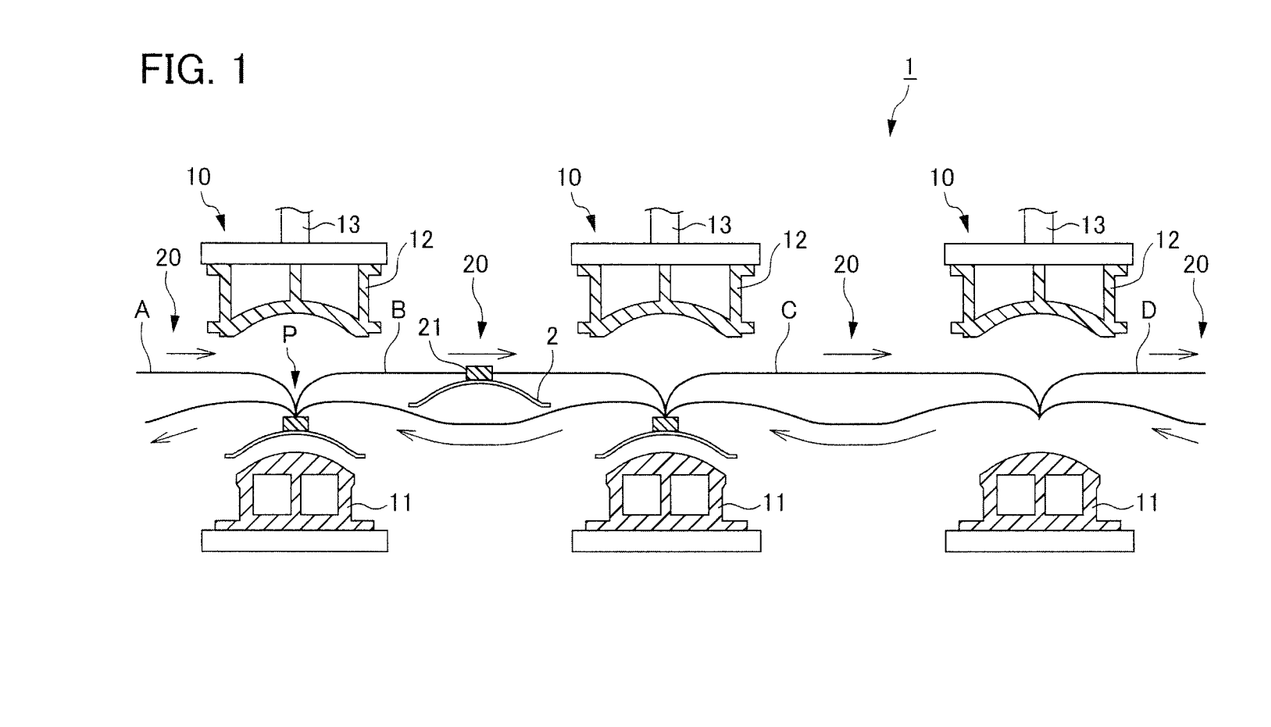
FIG. 1 is a view showing an outline configuration of a press line to which a transfer apparatus according to a first embodiment of the present invention has been applied.

FIG. 1 is a view showing an outline configuration of a press line 1 to which a transfer apparatus according to a first embodiment of the present invention has been applied.

The press line 1 is a tandem press line, and includes a plurality of pressing machines 10 that process a work 2, and a plurality of transfer apparatuses 20 that transfer the work 2 between these pressing machines 10.

Each pressing machine 10 has a lower mold 11 that is disposed on an underside of the work 2, an upper mold 12 that is disposed to be facing this lower mold 11, a hoisting mechanism 13 that causes the upper mold 12 to approach and separate with relation to the lower mold 11, and a control device, which is not illustrated, that controls this hoisting mechanism 13.

The above pressing mechanism 10 presses the work 2 by causing the upper mold 12 to approach the lower mold 11 by way of the control device.

Figure 2:
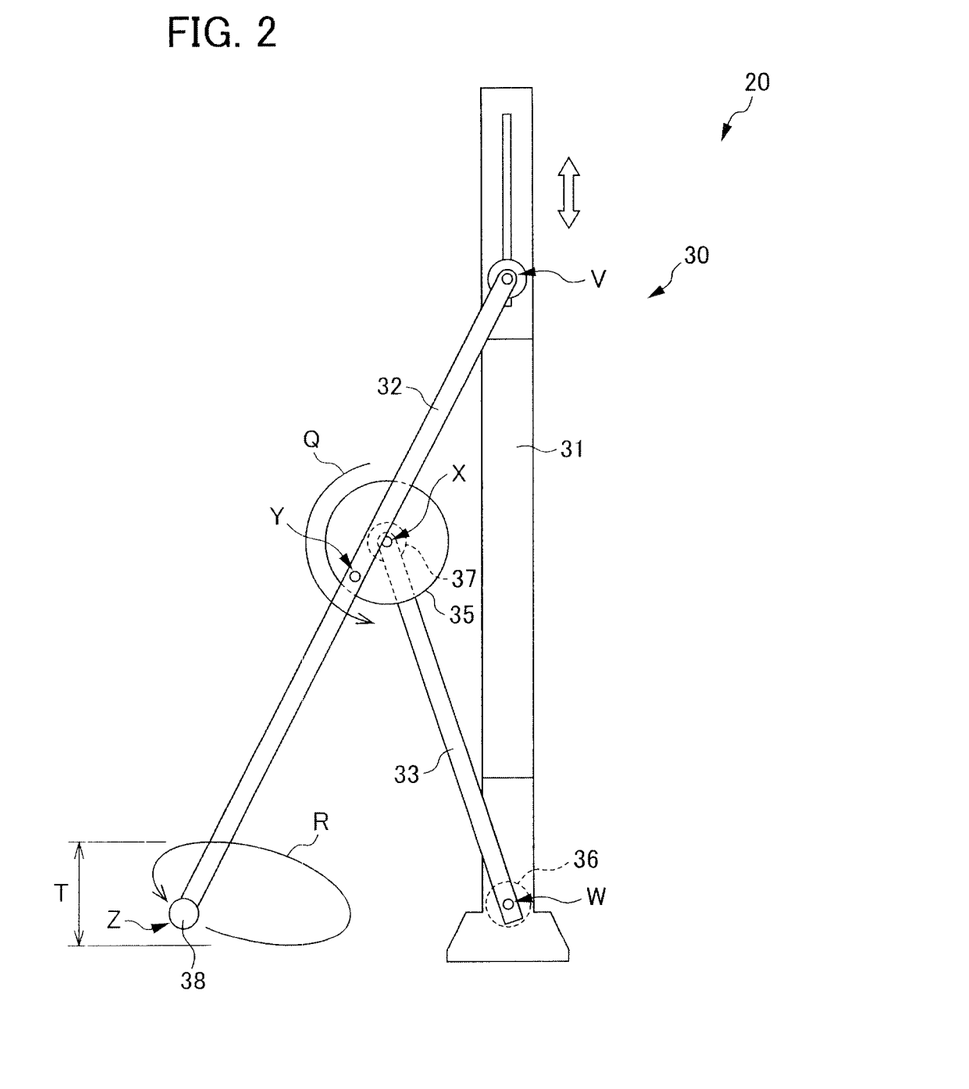
FIG. 2 is a view showing an outline configuration of a Scott-Russell mechanism of a transfer apparatus according to the embodiment.

Each of the transfer apparatuses 20 include a holding apparatus 21 that holds the work 2, and a pair of Scott-Russell mechanisms 30 that causes this holding apparatus 21 to move (refer to FIG. 2). It should be noted that, although the holding apparatus 21 is moved by a pair of Scott-Russell mechanisms 30 in the present embodiment, it is not limited thereto, and the holding apparatus may be moved by way of one Scott-Russell mechanism.

The holding apparatus 21 is a suction-retaining means in which a vacuum cup and the like are included, and suctions a surface of the work 2 to retain.

This transfer apparatus 20 transfers the work 2 in a state in which the work 2 is held by the holding apparatus 21 by way of causing the holding apparatus 21 to move along a path shown by the solid line A-D in FIG. 1 by means of a pair of Scott-Russell mechanisms 30.

For example, at the pick-up point P in the path of the solid line B in FIG. 1, the work 2 is retained, lifted by a large amount, transitions to advancing motion, is lowered by a large amount, and then is released by the holding apparatus 21. Thereafter, it is lifted by a small amount, transitions to return movement, lowered by a small amount, and returned again to the pick-up point P.

Figure 3:
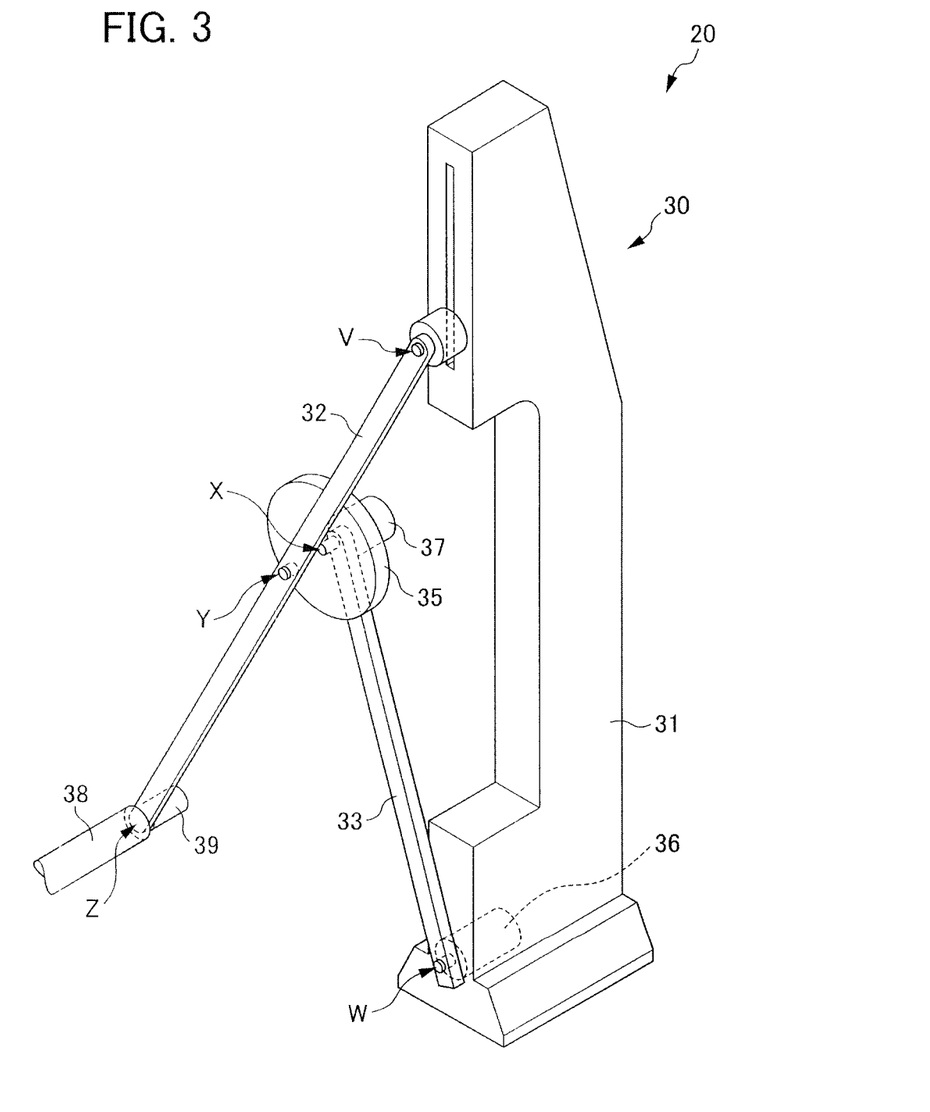
FIG. 3 is a perspective view of the Scott-Russell mechanism according to the embodiment.

FIG. 2 is a view showing an outline configuration of the Scott-Russell mechanism 30 of the transfer apparatus 20. FIG. 3 is a perspective view of the Scott-Russell mechanism 30.

Although one of the pair of Scott-Russell mechanisms will be explained hereinafter, the other one is a similar configuration.

The Scott-Russell mechanism 30 has a base section 31, a follower arm 32 that is connected to the base section 31 at a base-section end side, a connecting arm 38 that connects the leading end side of follower arms 32 and supports the holding apparatus 21, a first drive arm 33 that is connected to the base section 31 at a base-section end side, a second drive arm that connects the first drive arm 33 and the follower arm 32, a first drive device 36 that regulates an angle formed by the first drive arm 33 and the base section 31, a second drive device 37 that regulates an angle formed by the second drive arm 35 and the first drive arm 33, and a third drive arm 39 that turns the connecting arm 38.

The first drive arm 33 is connected to the base section 31 by a connecting shaft W of the base-section end side.

The second drive arm 35 is a disk shape, and is rotatably connected to the first drive arm 33 at the center, as well as being rotatably connected to the follower arm 32 at a periphery. With this, the second drive arm 35 is rotatably supported to the first drive arm 33 by a connecting shaft X of one end side, as well as being rotatably connected to the follower arm 32 by a connecting shaft Y of another end side.

The follower arm 32 is connected to the base section 31 by a connecting shaft V of a base-section end side to be rotatable and slidable up and down. The aforementioned holding apparatus 21 is connected by a connecting shaft Z of a leading end side of the follower arm 32. In addition, the connecting shaft Y is centrally position in the length direction of the follower arm 32.

According to the above Scott-Russell mechanism 30, the holding apparatus 21 is made to undergo Scott-Russell parallel motion, i.e. move horizontally, by way of driving the first drive device 36 and regulating the angle formed by the first drive arm 33 and the base section 31. Furthermore, the holding apparatus 21 is made to ascend and descend by way of driving the second drive device 37 and regulating the angle formed by the second drive arm 35 and the first drive arm 33. In addition, the attitude of the holding apparatus 21 is regulated by driving the third drive device 39.

For example, when only the second drive device 37 is driven without driving the first drive device 36, and the second drive arm 35 is made to rotate in the arrow Q direction in FIG. 2, the leading end of the follower arm 32 moves by the lift breadth T, as shown by the arrow R in FIG. 2.

Figure 4:
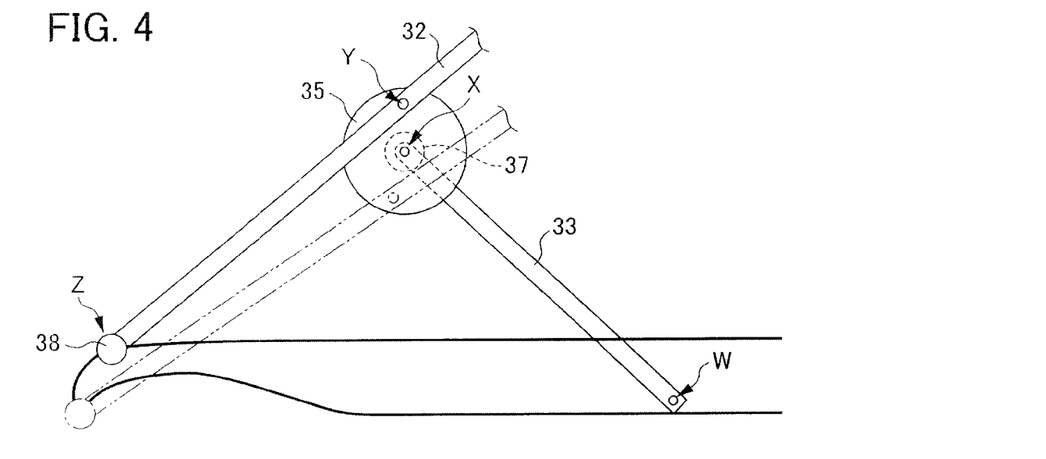
FIG. 4 is a view for illustrating movement of the Scott-Russell mechanism according to the embodiment.

Therefore, the holding apparatus 21 at the leading end of the follower arm moves on the trajectory shown by a solid line in FIG. 4 by way of combining drive of the first drive device 36 and drive of the second drive device 37.

Figure 5:
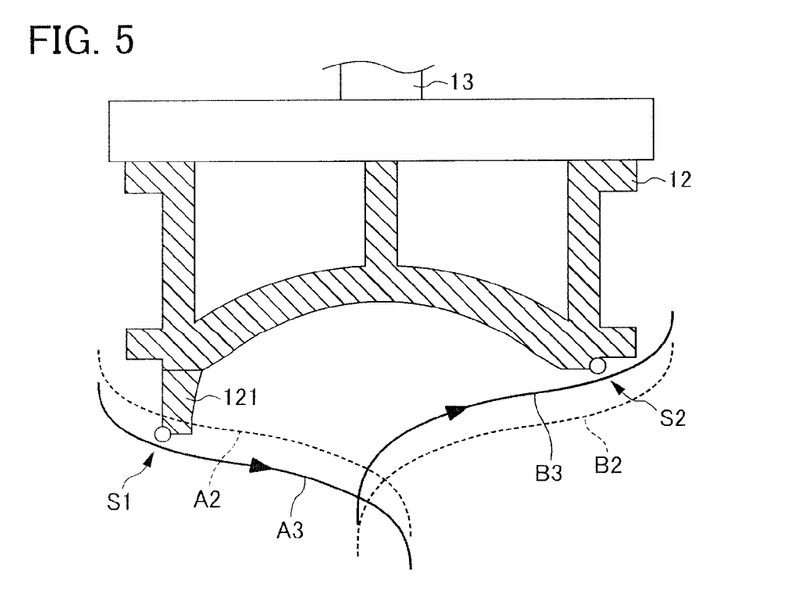
FIG. 5 is a view showing a relationship between a trajectory and an upper mold of a holding apparatus of a pressing machine of the press line according to the embodiment.

FIG. 5 is a view showing a relationship between the trajectory of the holding apparatus 21 and the upper mold 12.

Figure 6:
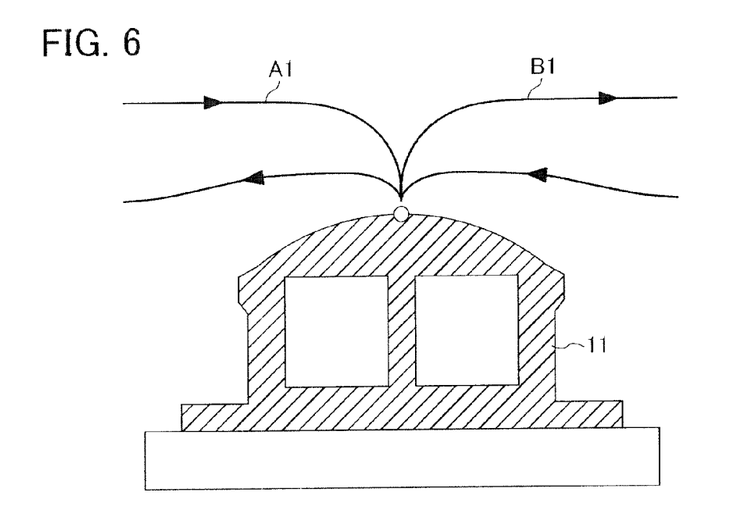
FIG. 6 is a view showing a relationship between a trajectory of the holding apparatus and a lower mold of the pressing machine of the press line according to the embodiment.

FIG. 6 is a view showing a relationship between the trajectory of the holding apparatus 21 and the lower mold 11. The solid lines A1 and B1 in FIG. 6 are the trajectories, i.e. transfer motions, of the holding apparatus 21. As shown in FIG. 6, the holding apparatus 21 transfers without causing interference to the lower mold 11.

On the other hand, a projection 121 is provided to a lower-left end portion in FIG. 5 of the upper mold 12.

The dotted lines A2 and B2 in FIG. 5 are trajectories, i.e. transfer motions, of the holding apparatus 21 relative to the upper mold 12. This transfer motion shows a positional relationship between the holding apparatus 21 and the upper mold 12, which slides up and down, with the position of the upper mold 12 as a reference.

As shown in FIG. 5, since the projection 121 is provided to the lower-left end portion of the upper mold 12, in a case of causing the holding apparatus 21 to move on the transfer motion shown by the solid line A1 in FIG. 6, the holding apparatus 21 interferes with the upper mold 12 at a point of interference S1, as shown by the dotted line A2 in FIG. 5.

However, the transfer motion of the holding apparatus 21 changes to be the solid line A3 by driving the second drive device 37, and thus it is possible to prevent the holding apparatus 21 and the upper mold 12 from interfering.

In addition, as shown in FIG. 6, since a projection is not provided at the right-side end portion of the upper mold 12, in a case of causing the holding apparatus 21 to move on the transfer motion shown by the solid line B1 in FIG. 6, there is margin for interference since there is space between a point of interference S2 and the transfer motion, as shown by the dotted line B2 in FIG. 5.

Then, the transfer motion of the holding apparatus 21 changes to be the solid line B3 by driving the second drive device 37, and thus it is possible to make the holding apparatus move at higher speed.

Incidentally, with the aforementioned transfer apparatus 20, two states exist for the position of the second drive arm 35 relative to the one attitude of the follower arm 32.

Figure 7:
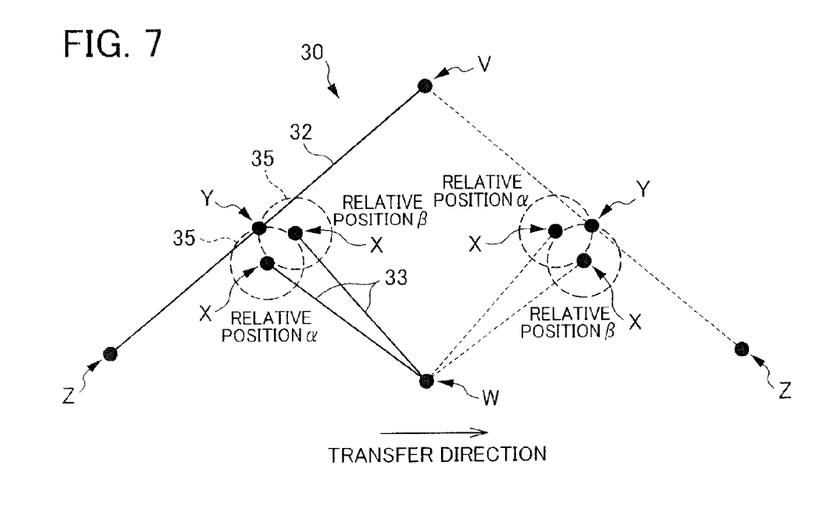
FIG. 7 is a schematic diagram showing a positional relationship of a follower arm, first drive arm, and second drive arm according to the embodiment.

FIG. 7 is a schematic diagram showing a positional relationship between the follower arm 32, first drive arm 33, and second drive arm 35.

In other words, as shown in FIG. 7, the relative position of the connecting shaft X to the connecting shaft Y has the two states of relative position α and relative position β. Therefore, in a case of undergoing motion holding the work 2, the relative position α is assumed, and in a case of undergoing motion releasing the work, the relative position β is assumed, and the relative position α and the relative position β can be alternately repeated.

However, if the relative position α and the relative position β are alternately repeated, there is a problem in that control of the second drive device 37 becomes complicated. In addition, in the relative position β, there is a problem in that the connecting shaft X approaches the pressing machine 10 after transfer of the work has completed. Therefore, the relative position β is assumed in the present embodiment.

According to the present embodiment, there are the following effects.

(1) The holding apparatus 21 can be moved horizontally by regulating the angle formed by the first drive arm 33 and the base section 31 by the first drive device 36.

Furthermore, the holding apparatus 21 can ascend and descend by providing the second drive arm 35, and regulating the angle formed by the second drive arm 35 and the first drive arm 33 by the second drive device 37. Therefore, the holding apparatus 21 can be moved to any position, and the degrees of freedom in the transfer path of the work 2 can be improved, by regulating the angle formed by the first drive arm 33 and the base section 31, while regulating the angle formed by the second drive arm 35 and the first drive arm 33.

Since it is possible for only the holding apparatus 21 to ascend and descend in this way, it is unnecessary to cause the entire apparatus to ascend and descend, and thus the configuration of the transfer apparatus can be simplified. As a result, a long distance can be transferred at high speed compared to conventionally, by preventing an increase in size of the apparatus.

Second Embodiment

Figure 8:
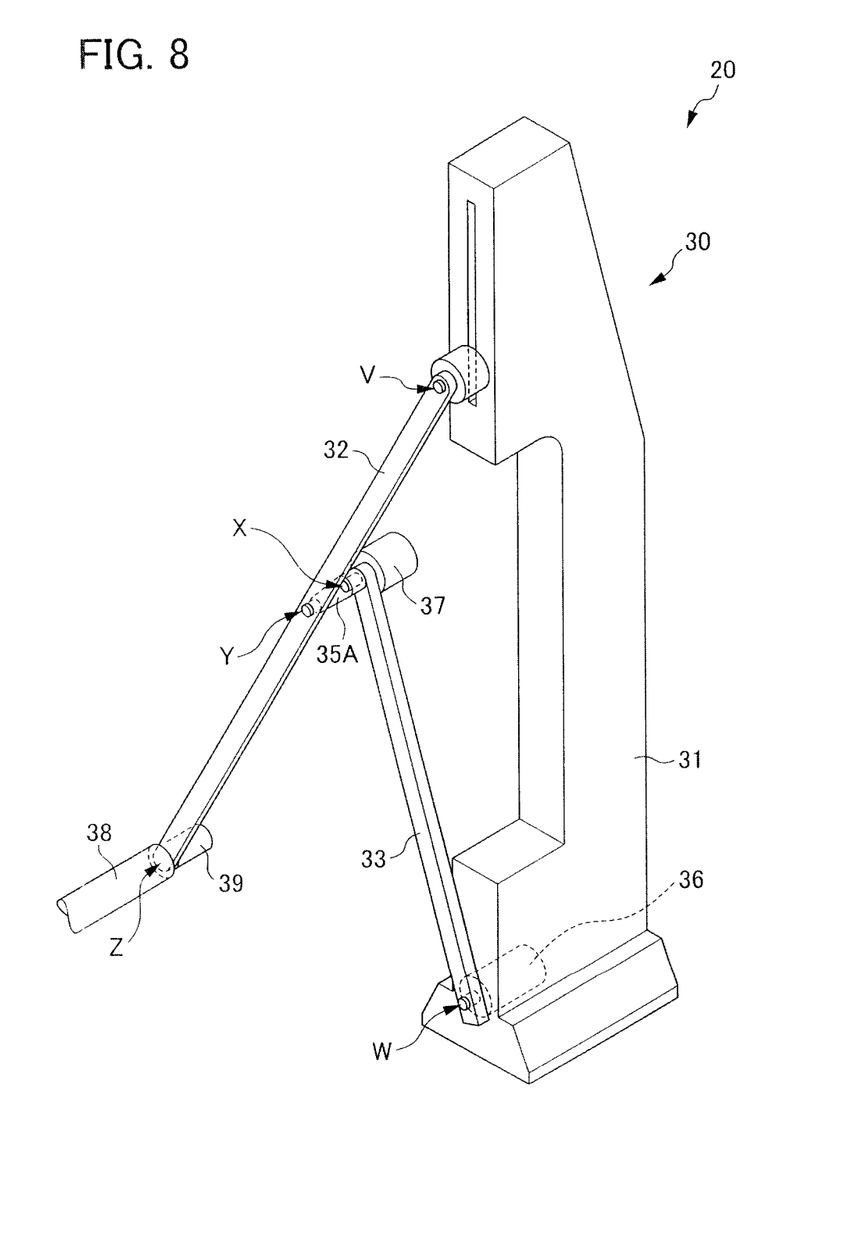
FIG. 8 is a perspective view of a Scott-Russell mechanism of a transfer apparatus according to a second embodiment of the present invention.

In the present embodiment, the structure of a second drive arm 35A is different from the first embodiment.

In other words, in the present embodiment, the second drive arm 35A is rotatably connected to the first drive arm 33 at one end, as well as being rotatably connected to the follower arm 32 at another end.

According to the present embodiment, there are effects similar to the aforementioned (1).

It should be noted that the present invention is not limited to the embodiments, and modifications, improvements, etc. within a scope that can achieve the object of the present invention are included in the present invention.

For example, in the present embodiment, although the connecting shaft W and the connecting shaft X were set to be drive shafts, it is not limited thereto. In other words, any two among the connecting shaft V, connecting shaft W, connecting shaft X, and connecting shaft Y may be set as drive shafts.

In addition, although the connecting shaft Y was provided at the center in the length direction of the follower arm 32, it is not limited thereto, and it may be provided at another position in order to obtain a movement range suited for a transfer operation.

The invention claimed is:

1. A transfer apparatus that transfers a work to a pressing machine, comprising:
    a base section;
    a follower arm that is connected to the base section on a base-section end side to be rotatable and slidable up and down;
    a first drive arm that is rotatably connected to the base section on the base-section end side;
    a second drive arm that is rotatably connected to the first drive arm on the base-section end side, and is rotatably connected to the follower arm on a leading end side; and
    a holding apparatus that is provided on the leading end side of the follower arm and holds the work.

* * * * *